Nov. 15, 1927.                    1,649,568
B. BUSCH
AIROMETER
Filed Sept. 16, 1925
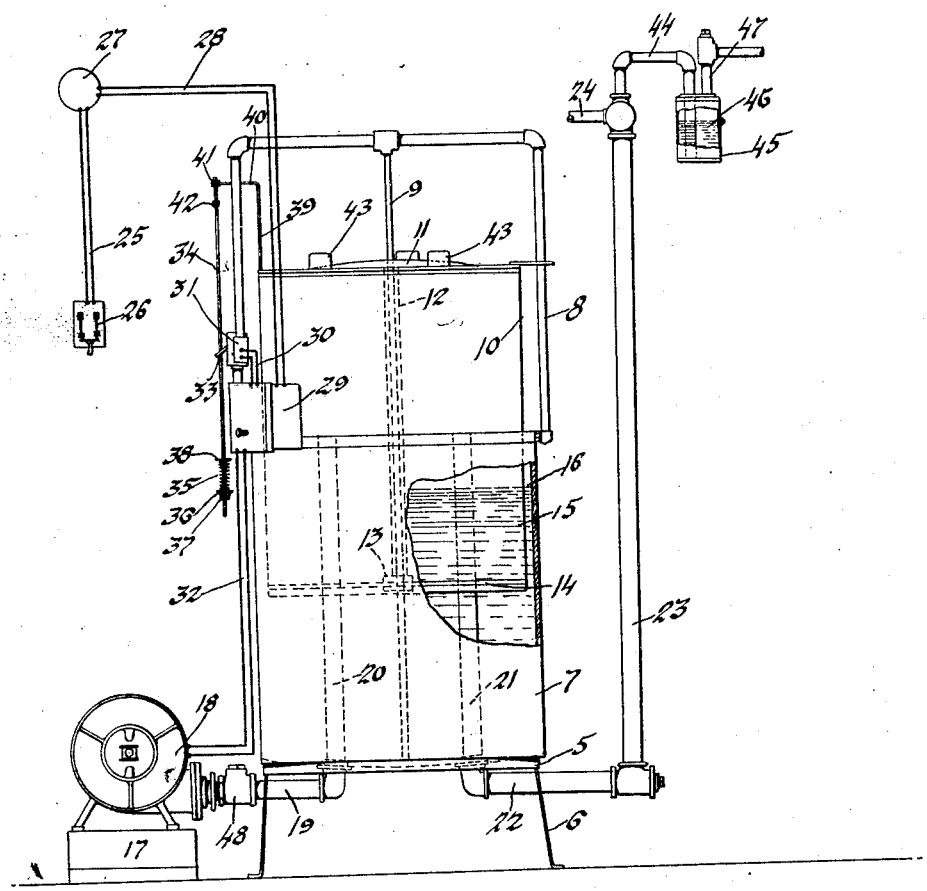
Inventor
Ben Busch
By
(signature)
Attorney Patented Nov. 15, 1927.

1,649,568

UNITED STATES PATENT OFFICE.

BEN BUSCH, OF DETROIT, MICHIGAN, ASSIGNOR, BY MESNE ASSIGNMENTS, TO EDWARD D. CLARK, OF MORENCI, MICHIGAN.

AIROMETER.

Application filed September 16, 1925. Serial No. 56,777.

My improved device is intended primarily to produce air under pressure and to feed such air to any desired point, and is especially designed for use in connection with domestic production of gas.

Among the various objects of my invention are the production of an economical device of the class described; one which shall be composed of a relatively small number of parts which are easily assembled and can be easily taken apart; as well as a device which shall be entirely automatic in its operation and shall embody features rendering its operation entirely safe both with regard to the device itself and with regard to those about it.

With the above and other objects in view, my invention consists in the arrangement, combination and construction of the various parts of my improved device as described in the specification, claimed in my claims and shown in the accompanying drawing, in which:

The single figure is an elevation of my improved device, certain portions thereof being cut away to better illustrate the invention.

I have shown a foundation, or support 5, mounted upon legs 6 and having a tank or container 7 positioned thereon. Positioned on the top of the tank 7 is a supporting frame of U shaped formation, indicated generally as 8. The frame extends above the tank 7 and has a rod 9 depended from the horizontal portion thereof into the tank 7.

The top of the tank 7 is open, and a tank 10, having an open bottom and a closed top 11, is inserted therein. Depended from the top 11 of the tank 10, is a pipe 12, which extends to the bottom of the tank 10, where it is provided with a collar 13, from which extend struts 14 for reinforcing the bottom of the tank 10. The rod 9 extends through the top 11 of the tank 10 and downwardly through the pipe 12 to the bottom of the tank 7. Any suitable fluid 15, such as water, is placed in the tank 7 to a level above the bottom of the tank 10, as at 16.

Mounted upon a suitable support 17 at one side of the tank 7, and its support 5, is a conventional electric motor and blower unit, indicated generally as 18, and connected with the interior of the tanks through a conduit 19 extending under the tank 7, and a conduit 20, extending upwardly therein, which latter conduit extends above the liquid level 16 in the tank 7. A second conduit 21 is provided in the tank 7, extending to substantially the same level as the conduit 20 and is connected with a conduit 22 leading from the bottom of the tank 7 and thence through a conduit 23 and a conduit 24 to a desired point, which in a domestic gas making plant may be to the carburetor thereof.

For the operation of the electric motor and blower unit, an electrical conductor 25 extending from a conventional switch 26 of an electrical system is provided, which conductor leads through a conventional knockout box 27 and conductor 28 to a conventional circuit breaker box 29, and thence through the conductor 30 to a switch 31 and thence through the conductor 32 to the electric motor.

Thus, when the electrical circuit is completed through the switch 26, the motor blower unit 18 will be operated to force air through the conduits 19 and 20 into the upper portions of the tanks 7 and 10.

The circuit breaker box 29 will serve its usual function of breaking the connection to the motor blower unit in the event of an accident occurring in the electrical system.

The switch 31 is operated by a handle 33 extending therefrom and a rod 34 is provided extending vertically through the handle 33 and having on the bottom thereof a coiled spring 35 held in place by a washer 36 and a nut 37. A washer 38 is also provided on the top of the spring 35. For the support of the rod 34, a rod 39 is mounted on the top of the tank 10 and is horizontally bent to form the portion 40 which is bolted, as at 41, to the top of the rod 34. A nut, or other suitable projection 42, is provided on the rod 34 adjacent the top thereof.

It will be seen, therefore, that as air is forced into the tanks 7 and 10 through the conduit 20, the liquid 15 in the bottom of the tank 7, having a level above the bottom of the tank 10, will form a seal for the tanks so that the air will become compressed and will raise the tank 10, as the pressure increases. When the tank 10 has been raised to such a point that the washer 38 on the rod 34 will press against the handle 33 of the switch 31, the handle 33 will be raised to throw the switch 31 and disconnect the motor blower unit from the electrical system. The air thus compressed in the tanks 7 and 10 may escape through the conduits 21, 22 and 23 to the point where it is desired to use the same, as through the conduit 24. As the air is used up, the tank 10 will of course fall with the result that the rod 34 will correspondingly fall until the nut or other projection 42 thereon strikes the top of the handle 33, at which time the handle 33 will be pushed downwardly to again make the electrical connection to the motor blower unit to repeat the charging of the tanks with air.

In this connection, it will be noted that a plurality of weights 43 may be provided on the top of the tank 10 to prevent too quick raising thereof and also to cause the lowering of the tank 10 as the pressure therein decreases. It will be readily appreciated that the total of these weights may be proportioned according to the size of the system used.

In addition to the conduit 24 connected to the conduit 23, a conduit 44 is provided above the connection between the conduits 23 and 24 and extends into the small container 45, which container is provided with a suitable fluid 46, such as oil, and has a conduit 47 extending from the top thereof and leading to the atmosphere. It will be appreciated that the oil 46 normally forms a seal to prevent the escape of air through the chamber 45, but in the event of the accumulation of excess pressure in the system, as by the failure of the switch 31 to shut off the motor blower unit, air, when it reaches such excess pressure, may bubble through the oil 46 and escape to the atmosphere.

As a further check for the safety of the device, a conventional safety check valve 48 may be provided in the conduit 19 leading from the motor blower unit, which will be operated by excess pressure to permit air furnished by the blower to pass directly to the atmosphere instead of into the tanks 7 and 10.

It will be obvious that many of the devices utilized in my improved construction are of conventional type and I have not, therefore, illustrated them in detail, inasmuch as those skilled in the art are familiar with their construction and to illustrate them in detail would add unnecessary matter to this specification.

It will be obvious that various changes may be made in the arrangement, combination and construction of the various parts of my improved device without departing from the spirit of my invention, and it is my intention to cover by my claims such changes as may be reasonably included within the scope thereof.

What I claim is:

1. In combination, a base member, a tank mounted thereon having a closed bottom and an open top, support members extended upwardly from said tank, a cross piece securing the ends of said members together, a rod depended from said cross piece into said tank, a second tank having an open end extended into said first tank and closed end extended above the same, a tubular member within said second tank, depended from the top thereof, said rod being fitted into said tubular member so as to guide said second tank for vertical reciprocation, liquid in said tanks above the meeting lines of their adjacent ends so as to seal them, a conduit in said first tank and having an open end extending above said liquid level, means for forcing air through said conduit and a second conduit leading from a point in said tanks above said liquid level to a disposed point, an oil chamber, a third conduit leading from said second conduit into the oil in said chamber, and a vent in said chamber, whereby air in said conduit may be normally held from escape through said chamber but may be permitted to pass through it when compressed to a predetermined point.

2. In combination, a tank, means for forcing air therein, means for automatically discontinuing the forcing of air therein when the pressure has reached a predetermined point, means for automatically continuing the forcing of air therein when the pressure has dropped to a predetermined point, and means for automatically permitting the escape of air from said tank in event of pressure therein raising to a predetermined point above said first predetermined point.

BEN BUSCH.